US005697586A

United States Patent [19]
Lybarger

[11] Patent Number: 5,697,586
[45] Date of Patent: Dec. 16, 1997

[54] APPLIANCE MOUNTING ASSEMBLY

[75] Inventor: Michael Alvin Lybarger, Louisville, Ky.

[73] Assignee: General Electric Company, Louisville, Ky.

[21] Appl. No.: 427,891

[22] Filed: Apr. 26, 1995

[51] Int. Cl.$^6$ ................................................ F16M 11/24
[52] U.S. Cl. .................................. 248/188.4; 248/188.2; 248/649; 248/672
[58] Field of Search ....................... 248/188.4, 188.2, 248/188.91, 605, 638, 649, 672; 312/351.5, 351.7, 351.8

[56] References Cited

U.S. PATENT DOCUMENTS

| 842,641 | 1/1907 | Fernau | 248/188.4 |
|---|---|---|---|
| 2,683,576 | 6/1954 | Miller | 248/188.3 |
| 2,890,545 | 6/1959 | Fiddler | 248/188.4 |
| 3,304,032 | 2/1967 | Yates | 248/2 |
| 3,868,079 | 2/1975 | Johnson | 248/188.4 |
| 3,970,273 | 7/1976 | Tanner | 248/188.4 |
| 4,262,870 | 4/1981 | Kretchman et al. | 248/188.3 |
| 4,653,968 | 3/1987 | Rapata et al. | 411/247 |
| 4,801,114 | 1/1989 | Price | 248/188.3 |
| 4,915,334 | 4/1990 | White | 248/188.4 |
| 4,949,923 | 8/1990 | Daily | 248/188.3 |
| 5,169,115 | 12/1992 | Hsiang | 248/188.8 |
| 5,482,236 | 1/1996 | Abell | 248/649 |

FOREIGN PATENT DOCUMENTS 11579 of 1914 United Kingdom ............... 248/188.4

*Primary Examiner*—Ramon O. Ramirez
*Assistant Examiner*—Gwendolyn W. Baxter
*Attorney, Agent, or Firm*—H. Neil Houser

[57] ABSTRACT

An assembly to mount an appliance on a floor includes a pair of openings in the appliance base, each surrounded by a helical thread. The thread includes a pair of downwardly projecting detents. A mount for each opening includes a head with a shaft extending from the top thereof and received in the opening. The shaft includes an external helical thread mating with the appliance base thread. The mount is made of plastic which cold flows sufficiently for the shaft thread to conform to the detents. An unbalance responsive mechanism includes a strap extending across the housing with a transverse pin adjacent each end. A mount for each end of the strap includes a head with a shaft extending from the top thereof. The distal end of the shaft includes transverse openings to receive an end portion of the strap and the corresponding transverse pin. Non-skid, insulating pads are bonded to the bottom of the heads.

14 Claims, 3 Drawing Sheets

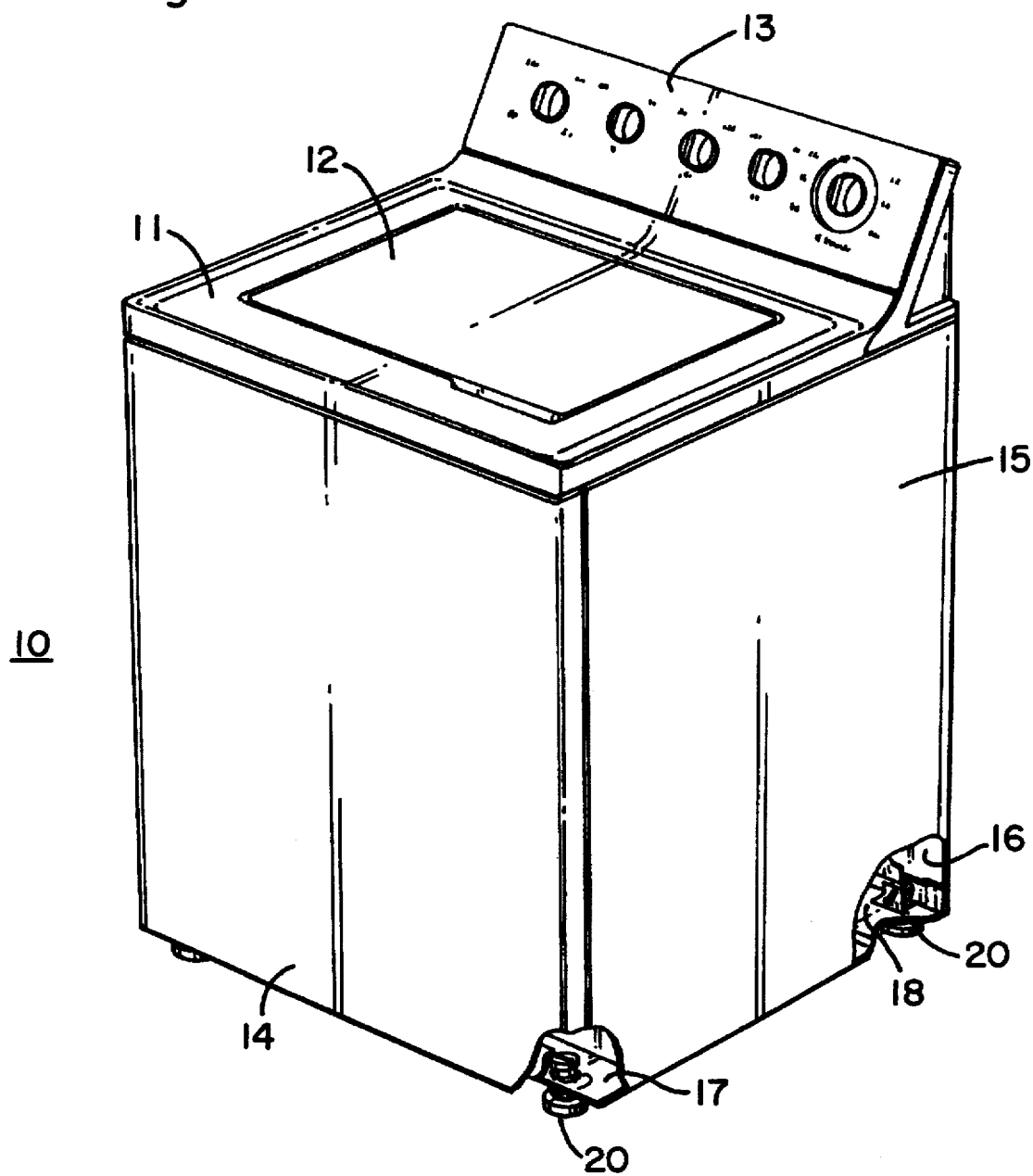

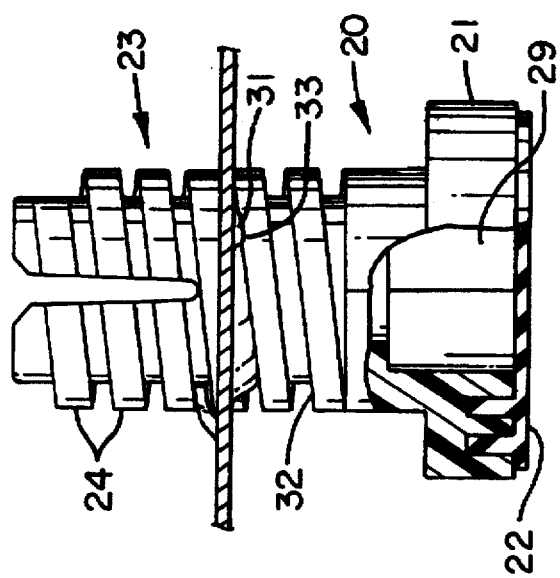
Fig. 3
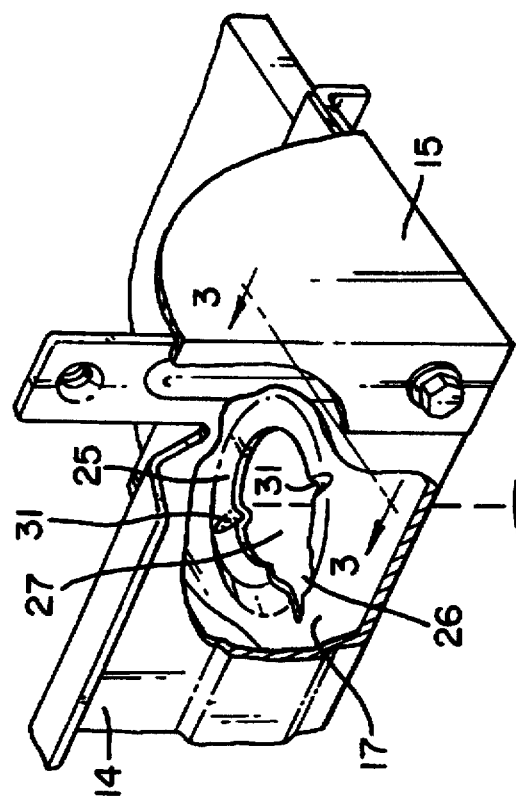
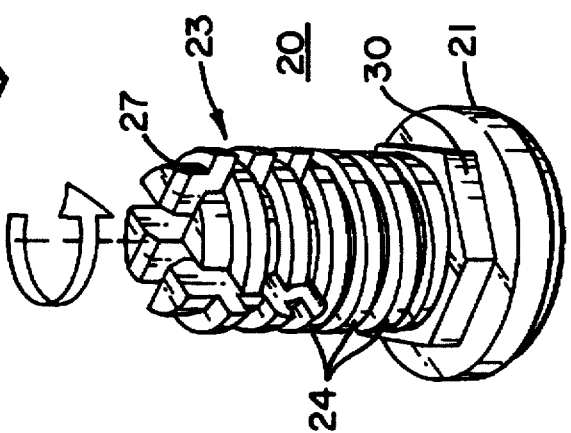
Fig. 2

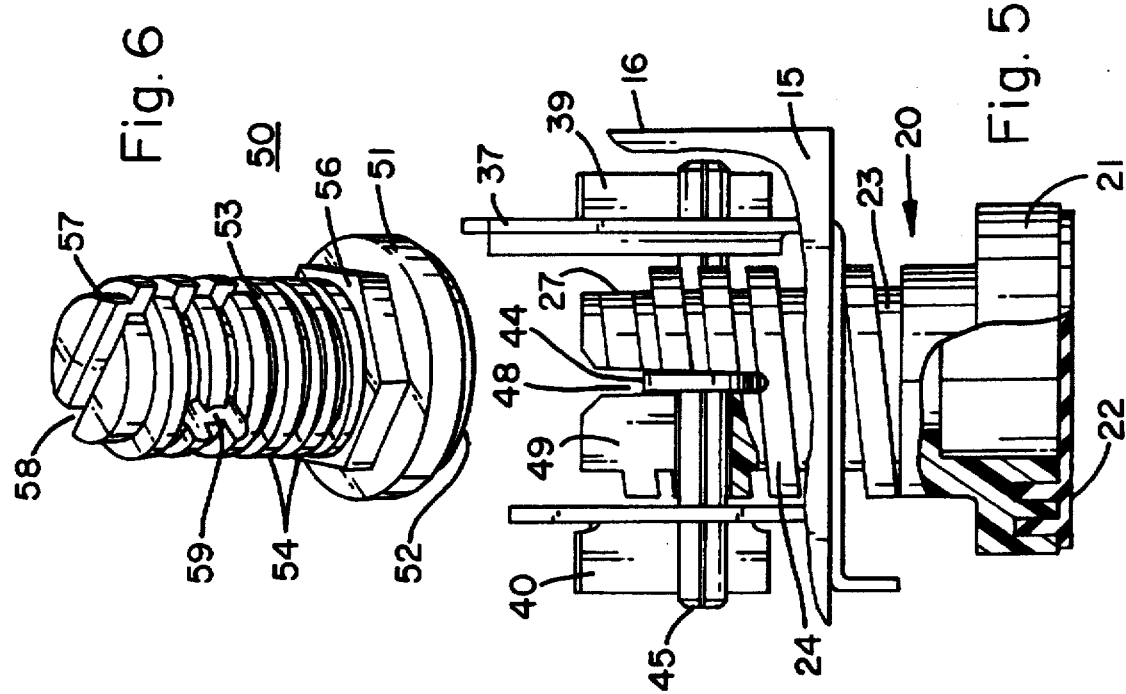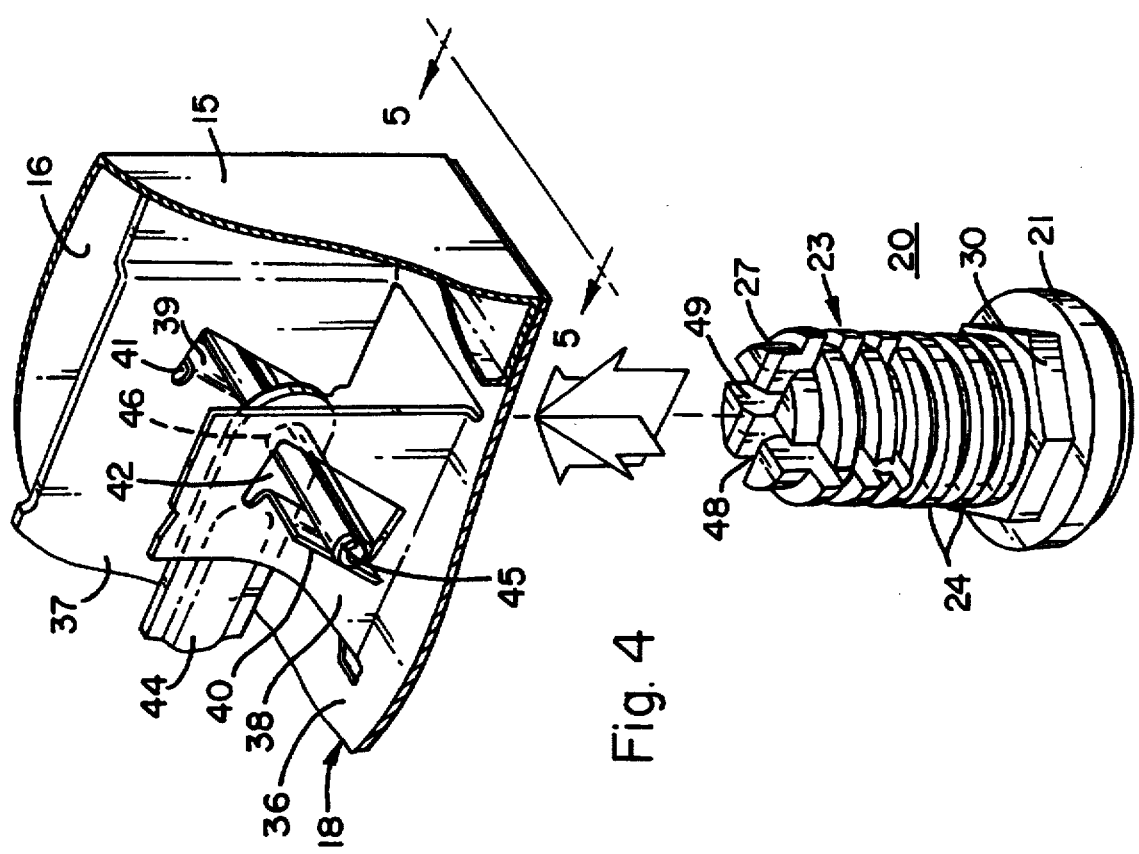

5,697,586

APPLIANCE MOUNTING ASSEMBLY

BACKGROUND OF THE INVENTION

Major household appliances, such as automatic clothes washers, clothes dryers and refrigerators for example, typically include some mechanism for leveling the appliance housing so that it will operate optimally, even though the floor on which it is mounted is not level. In addition, some appliances, particularly automatic clothes washers, include mechanisms to adjust the mounting of the machine in response to unbalanced or non-symmetric loads, such as when the washer is centrifugally extracting water from an unbalanced load.

Clothes washers typically have adjustable mounts or feet adjacent their front corners and an unbalance compensating mechanism at their rear. Typically the unbalance compensating mechanism includes a strap, bar or rod which is connected to mounting feet with a degree of freedom so that the strap can move relative to the feet or to the housing to compensate for the unbalance.

Such assemblies and mechanisms present a number of problems in the manufacture and use of such appliances. For example it is desirable to assemble the mounts or feet to the housing at the factory. However, if they are attached early in the manufacturing process, they are subject to damage and inhibit the use of traditional conveyor systems for subsequent manufacturing steps.

It is desirable that the mounts be easily and quickly assembled to the unbalance compensating mechanism, preferably by merely snapping them into place.

Typically the front mounts are rotatable relative to the housing base to adjust their height when the appliance is installed. It is desirable that the mounts be easily installed at the factory using normal factory equipment and, at the same time, be adjustable at appliance installation, using only normal hand tools such as a wrench.

Typically the front mounts and the mounts or feet used with the unbalance compensating mechanism are significantly different. In some highly automatic manufacturing processes, it is advantageous to use a single design mount for all locations, even though each mount includes features that are not needed in any particular individual location.

SUMMARY OF THE INVENTION

In accordance with one embodiment of the present invention an appliance leveling assembly includes an appliance housing with a base. An opening is provided in the base adjacent each front corner of the housing, surrounded by a helical thread with a pair of axially projecting detents. An unbalance mechanism at the rear of the housing includes a strap extending across the base, with a transverse cross member adjacent each of its ends. A mount is provided for each opening and each end of the strap. Each mount includes a head with a bottom to support the appliance from a floor and an elongated shaft extending from the top of the head. The shaft includes an external helical thread which mates with a corresponding helical thread in the base. The mount is molded from a plastic material which will cold flow sufficiently for the shaft thread to conform to the detents on the housing thread. The distal end of the shaft remote from the head includes a pair of mutually perpendicular openings which receive one end of the strap and the associated cross member. A pad is bonded to the bottom of the head and engages the floor.

BRIEF DESCRIPTION OF THE DRAWINGS

FIG. 1 is a simplified, perspective view of an automatic clothes washer, partly broken away, incorporating a mounting system constructed in accordance with the principals of the present invention.

FIG. 2 is a fragmentary exploded perspective view of the lower right front corner portion of the washer of FIG. 1, illustrating certain aspects of the housing and front leveling mounts.

FIG. 3 is a fragmentary cross section view as seen along line 3—3 in FIG. 2, but with the mount assembled to the housing.

FIG. 4 is a fragmentary exploded perspective view of the lower right rear corner portion of the machine of FIG. 1, illustrating certain aspects of the unbalance compensating mechanism and rear mounts.

FIG. 5 is a cross section view of the mechanism of FIG. 4, but with the mount assembled to the unbalance compensating mechanism.

FIG. 6 is a perspective view of another mount usable in the machine of FIG. 1.

DETAILED DESCRIPTION OF PREFERRED EMBODIMENTS

FIG. 1 illustrates a top loading automatic clothes washer or washing machine 10 with a top 11 having a door 12 providing access to the interior of the machine for loading and unloading items to be washed. A backsplash 13 contains various controls for user control of the operation of the machine. The machine 10 has a hollow, rectangular, box like housing with a front panel 14, side panels 15 and a rear panel 16. The housing includes a base joining the various vertical panels 14-16. In the illustrative machine 10, the housing base includes a front brace 17, which extends between the side panels 15 just inside the front panel 14, and a rear brace 18, which extends between the side panels 15 just inside the rear panel 16.

The operating components of washer 10 are not part of the present invention and have been omitted for the sake of simplicity. However it will be understood that, when machine 10 is operated to wash a load of fabrics, forces are generated and transferred to the floor on which the machine is mounted. This is particularly true when the machine spins the fabric containing tub (not shown) at high speed to centrifugally extract liquid from the fabrics. If the machine is not level or the weight distribution is non-symmetric, these forces often will cause the machine to "walk", that is to move across the floor on which it is mounted.

There are two aspects to leveling the housing. First mounts or feet are mounted to the base adjacent the front corners of the housing. These mounts are vertically adjustable to level the housing. Second, an unbalance compensating mechanism normally is provided at the rear of the machine to enable the rear of the machine to move relative to the rear mounts in response to unbalanced forces generated during operations, particularly during extraction.

Referring now to FIGS. 2 and 3, there is illustrated the right front mount and its connection to the base of the housing of the illustrative machine 10. In particular a mount 20, positioned adjacent the right front corner of the machine, and its connection to or mounting on the front brace 17 is illustrated. It will be understood that an identical mount is connected to the front brace 17 adjacent the left front corner of the housing. Preferably the mount 20 is molded form a suitable plastic material such as polypropylene. The mount 20 includes a head 21 with a pad 22 overlying its bottom. Preferably the pad is formed from a suitable plastic material, such as sontoprene. Preferably the pad is placed in the mold for the mount before the mount is formed and bonds to the mount 20 during the molding process. The pad 22 serves two purposes. First it provides an anti-skid surface to inhibit the machine from sliding across the floor on which it is mounted. Second, it isolates vibrations of the machine from the floor.

A shaft 23 projects perpendicularly from the top of the head 21 and includes a helical thread 24 along its outer surface. A mating helical thread 25 with an interruption 26 is formed in the front brace 17 and defines a central opening 27. The mount 20 is mounted on the brace 17 by inserting the distal end 27 of the shaft 23 into the opening 26 and then rotating the shaft to engage the thread 24 with the thread 27. The length of the shaft 23 below the brace 17, and thus the distance from the bottom of machine 10 to the bottom of pad 22, is adjusted by screwing the shaft into and out of the brace. For this purpose the bottom of the head 21 is formed with a polygonal recess 29 to receive a power tool for mounting and adjusting the position of the mount 20 during manufacture of the machine 10. A polygonal collar 30 is formed on the outer surface of shaft 23 next to the head 21. This provides a drive surface for a tool, such as an open end wrench for example, to adjust the height of the mount 20 when the machine is installed. In this way, during and after the machine is installed, the mount can be adjusted with the machine sitting upright in its normal operating orientation. Preferably both the recess 29 and the collar 30 are hexagonal to fit typical tools. Conveniently the mount 20 at each front corner of the machine 10 is essentially fully seated in the brace 17 during manufacture to minimize the possibility of damage during shipment. When the machine is installed, each mount 10 is then adjusted to level the machine.

Once the machine is leveled at installation, it is important that the front mounts 10 do not accidentally move relative to the front brace 17. The thread 25 includes a pair of detents 31 which project axially downward on diametrically opposite sides of the thread 25. The detents 31 are forced against the upper surface 32 of the thread 24 by the weight of the machine. The material of the shaft, polypropylene in the exemplification, will cold flow under this pressure sufficiently that the upper surface 32 will form indentations 33 which conform to the detents. The detents 31 and indentations 33 in the thread 24 form stops which deter the mounts 20 from accidentally moving relative to the brace 17. However, once someone deliberately moves a mount 20 slightly, its indentations 33 no longer hold the conforming detents 31 and the mount can easily be adjusted to another shaft height or length.

The weight of operational components of washing machines often is not distributed evenly. In addition the floor on which the machine is mounted may be uneven. This may result from the floor sagging under the weight of the machine, faulty floor construction or any of a number of other reasons. This tends to add to the non-symmetrical weight distribution of the machine and the machine may vibrate excessively and "walk" across the floor. Typically washing machines include an unbalance compensating mechanism or assembly to compensate for such non-symmetric weight distribution. Such mechanisms typically include a cross member, in the form of strap or rod, which extends across the rear of the machine and is mounted to the rear mounts or feet. Either the connections of the cross member to the feet or to the housing is vertically adjustable under the influence of the non-symmetrical weight distribution to compensate for such non-symmetry. One such system or assembly is disclosed in U.S. Pat. No. 3,304,032, issued to Roy K. Yates and assigned to General Electric Company, assignee of the present invention; which patent is hereby incorporated herein by reference.

Referring now to FIGS. 4 and 5, there is shown a part of the non-symmetrical weight or unbalance compensating assembly of the illustrative machine 10. The rear brace 18 includes a horizontal bottom wall 36 and a vertical side wall 37. A vertical tab 38 is lanced from the bottom wall 36 and bent upwardly to extend parallel to the side wall 37. Ears 39,40 are lanced form the side wall 37 and tab 38 respectively and bent outwardly. The ears are angled to provide angled slots 41,42 respectively. It will be seen that the tops of the slots and ears are closer to the side wall 15 than are their bottoms. While not shown, it will be understood that mirror image ears and slots are formed adjacent the other end of the rear brace 18. In this way the slots and ears at the ends of the brace converge from top to bottom. A strap 44 extends across the rear of the housing and has its ends generally aligned with the slot and ear arrangement adjacent each end of brace 18. A cross member 45 is mounted adjacent each end of the strap 44 and projects perpendicularly to each side of the strap. Conveniently the cross members are in the form of circular cross section cylindrical pins which are tightly received in circular openings 46 in the strap 44. Each cross member projects through the slots 41,42 and the weight of the machine causes the ears 39,40 to engage the cross members. Non-symmetric weight of or forces generated by the machine will cause the strap and cross members to shift relative to the machine. That is, one end of the strap will move downwardly relative to the corresponding ears and slots while, the other end of the strap will move upward relative to the corresponding ears and slots.

The mount 20 is designed for use with such non-symmetry or unbalance compensating or self-leveling mechanisms. More particularly the distal end of shaft 23, remote from head 21 is formed with mutually perpendicular slots 48 and 49 which extend axially into the shaft from its end and project transversely completely across shaft. The mount 20 is inserted about the junction of the strap 44 and cross member 45 with the strap 44 fitting closely in slot 48 and cross member 45 fitting closely in slot 49. The friction between shaft 23, on the one hand, and the strap 44 and cross member 45, on the other hand, maintains the mount on the strap.

FIG. 6 illustrates a mount 50 of slightly different construction than mount 20 The mount 50 has a head 51 and a shaft 53 with threads 54, a polygonal collar 56 and a distal end 57. The head also has a polygonal recess, not shown, in its bottom and a pad 52 is bonded to the bottom. The distal end 57 of shaft 53 includes one slot 58, which extends across the shaft and projects into the shaft from its end. A cylindrical hole or bore 59 extends through the shaft perpendicular to slot 58. Mount 50 is placed on the end of strap 44, with the strap tightly received in the slot 58 and with the opening 46 aligned with the bore 59, before the cross member is attached. Then the cross member 45 is inserted through the opening 46 and bore 59. Thus it will be recognized that mount 50 is more securely mounted on the strap 44 than mount 20 but the assembly process is slightly more complicated.

The mounts 20 and 50 have composite configurations. That is a single mount configuration can be used at both the front and back corners of a machine. This enables a manufacturer to stock only one part. It will be recognized that, if desired, the mounts can be modified to provide different configurations tailored to front and rear usage. On the one hand, mounts tailored for the front would not have either the crossed slots or the slot and bore arrangement at the distal end of the shaft. On the other hand mounts tailored for the rear would not have the thread, the polygonal collar on the lower portion of the shaft or the polygonal recess in the bottom of the head.

While specific embodiments of the invention have been illustrated and described herein, it is realized that modifications and changes will occur to those skilled in the art to which the invention pertains. It is therefore to be understood that the appended claims are intended to cover all such modifications and changes as fall within the true spirit and scope of the invention.

What is claimed is:

1. A mount for use with a major appliance including a base having a helical thread defining an opening, the helical thread having at least one detent, the appliance further including a self leveling mechanism having a strap, said mount comprising:

a head having a bottom adapted to support the appliance on a floor;

an elongated shaft projecting from a top of said head and sized to be received in the opening defined by the helical thread in the appliance base, said shaft including an exterior helical thread adapted to overlap the helical thread of the appliance base;

said shaft being formed of a plastic material which will cold flow under pressure exerted on said shaft thread as a result of the weight of the appliance sufficiently that said shaft thread will conform to the detent; and said shaft including a distal end portion remote from said head, said distal end portion defining mutually perpendicular openings adapted to mount said shaft on the self leveling mechanism of the appliance, at least one of said openings adapted to receive at least a portion of the strap of the appliance self leveling mechanism.

2. A mount as set forth in claim 1, wherein: said openings in said distal end portion of said shaft comprise a pair of transverse slots extending axially into said shaft.

3. A mount as set forth in claim 1, wherein; said openings in said distal end portion of said shaft comprise a transverse slot extending axially into said shaft and a bore extending through said shaft perpendicular said slot.

4. A mount as set forth in claim 1, wherein: a recess is formed in said one side of said head and adapted to receive a tool for rotatably mounting said shaft in the helical marginal portion of the appliance base.

5. A mounting foot as set forth in claim 4, wherein: said recess is polygonal in cross section.

6. A mount as set forth in claim 1, wherein: said shaft includes a polygonal outer collar adjacent said head for engagement by a tool to rotatably adjust the axial position of said shaft in a helical thread of the appliance base.

7. A mount as set forth in claim 1, further including an insulating, non-slip pad mounted to said bottom of said head and adapted to engage the floor.

8. A mount as set forth in claim 7, wherein: said pad is bonded to said head.

9. A leveling assembly for an appliance, including:

an appliance housing including a base;

a strap extending across said base and mounted for movement relative to said base in response to unbalanced weight distribution of said appliance and a cross member attached adjacent one of said strap;

an integral mount including a head with a bottom adapted to support said appliance on a floor and a top with a shaft projecting therefrom; and said shaft including a distal end portion remote from said head, said distal end portion defining mutually perpendicular openings adapted to receive said strap and said cross member for securely attaching said mount to said strap.

10. An assembly as set forth in claim 9, wherein: said openings in said shaft distal end portion comprise a pair of transverse slots extending axially into said shaft.

11. An assembly as set forth in claim 9, wherein; said openings in said shaft distal end portion comprise a transverse slot extending axially into said shaft and a bore extending through said shaft perpendicular said slot.

12. An assembly as set forth in claim 11, wherein:

said strap has a generally rectangular cross section and is closely received in said slot;

said bore has a generally circular cross section;

said cross member is a generally circular cross section pin extending perpendicular to said strap and received in said bore.

13. An assembly as set forth in claim 9, further including an insulating, non-skid pad mounted to said one side of said head and adapted to engage the floor.

14. An assembly as set forth in claim 13, wherein: said pad is bonded to said head.

* * * * *